United States Patent
Wright et al.

(10) Patent No.: US 11,979,499 B2
(45) Date of Patent: May 7, 2024

(54) SYSTEMS AND METHODS FOR MINING ON A PROOF-OF-WORK BLOCKCHAIN NETWORK

(71) Applicant: nChain Licensing AG, Zug (CH)

(72) Inventors: Craig Steven Wright, London (GB); John Fletcher, London (GB); Alexander Tennyson MacKay, London (GB)

(73) Assignee: nChain Licensing AG, Zug (CH)

( * ) Notice: Subject to any disclaimer, the term of this patent is extended or adjusted under 35 U.S.C. 154(b) by 314 days.

(21) Appl. No.: 17/610,390

(22) PCT Filed: Apr. 29, 2020

(86) PCT No.: PCT/IB2020/054033
§ 371 (c)(1),
(2) Date: Nov. 10, 2021

(87) PCT Pub. No.: WO2020/229925
PCT Pub. Date: Nov. 19, 2020

(65) Prior Publication Data
US 2022/0224534 A1 Jul. 14, 2022

(30) Foreign Application Priority Data

May 16, 2019 (GB) .................................... 1906893
Aug. 22, 2019 (GB) .................................... 1912070

(51) Int. Cl.
*H04L 9/30* (2006.01)
*G06F 21/64* (2013.01)
(Continued)

(52) U.S. Cl.
CPC .............. *H04L 9/302* (2013.01); *G06F 21/64* (2013.01); *H04L 9/3239* (2013.01); *H04L 9/50* (2022.05); *H04L 2209/46* (2013.01)

(58) Field of Classification Search
CPC ....... G06F 21/64; H04L 9/302; H04L 9/3239; H04L 2209/46; H04L 9/50
(Continued)

(56) References Cited

U.S. PATENT DOCUMENTS 9,495,668 B1 * 11/2016 Juels ......................... H04L 9/50
11,580,321 B2 * 2/2023 Wentz ..................... G06F 9/465
(Continued)

FOREIGN PATENT DOCUMENTS

EP           1078491 B1 *  4/2008   ........... G06Q 20/382

OTHER PUBLICATIONS

PCT/IB2020/054033 International Search Report dated Jul. 7, 2020.
(Continued)

*Primary Examiner* — Samson B Lemma
(74) *Attorney, Agent, or Firm* — Messner Reeves LLP (57) ABSTRACT

Embodiments of the present disclosure provides protocols, methods and systems which provides advantages such as the resistance of centralisation of mining on a blockchain network, preferably a Proof-of-Work blockchain. A method in accordance with an embodiment may comprise generating a plurality of non-parallelisable challenges (or "puzzles") and allocating one of said plurality of challenges to each miner on the network. The miner uses an inherently sequential (non-parallelisable) algorithm to find a solution to his allocated challenge. The challenges are generated by a committee of nodes, and a new set of challenges is generated for each block.

19 Claims, 2 Drawing Sheets

(51) Int. Cl.
*H04L 9/32* (2006.01)
*H04L 9/00* (2022.01)

(58) Field of Classification Search
USPC .......................................................... 713/168
See application file for complete search history.

(56) References Cited

U.S. PATENT DOCUMENTS

| 11,700,183 | B2* | 7/2023 | Jakobsson | G06Q 20/065 |
| | | | | 709/224 |
| 2019/0279210 | A1* | 9/2019 | Pen | H04L 9/3239 |
| 2019/0305968 | A1* | 10/2019 | Versteeg | H04L 9/3271 |
| 2019/0370793 | A1* | 12/2019 | Zhu | G06Q 20/06 |
| 2020/0201679 | A1* | 6/2020 | Wentz | H04L 63/1433 |

OTHER PUBLICATIONS

Henning Kopp et al: "uMine: A Blockchain Based on Human Miners : 20th International Conference, ICICS 2018, Lille, France, Oct. 29-31, 2018, Proceedings" In: "12th European Conference on Computer Vision, ECCV 2012", Jan. 1, 2018 (Jan. 1, 2018), Springer Berlin Heidelberg, Berlin, Heidelberg 031559,XP055707223, ISSN: 0302-9743 ISBN: 978-3-642-36741-0, vol. 11149, pp. 20-38.

Naomi Farley et al: "BADGER—Blockchain Auditable Distributed (RSA) key GEneRation", IACR, International Association for Cryptologic, Research, vol. 20190205:174940 Feb. 1, 2019 (Feb. 1, 2019), pp. 1-16, XP061031784, http://eprint.iacr.org/2019/104.pdf.

Isra Mohamed Ali et al: "Foundations, Properties, and Security Applications of Puzzles: A Survey", arxiv.org, Cornell University Library, 201 Olin Library, Cornell University Ithaca, NY 14853, Apr. 23, 2019.

Yves Igor Jerschow et al: "Non-Parallelizable and Non-Interactive Client Puzzles from Modular Square Roots", Availability, Reliability and Security (ARES), 2011 Sixth International Conference On, IEEE, Aug. 22, 2011 (Aug. 22, 2011), pp. 135-142.

UKIPO Combined Search and Examination Report for Application No. GB1912070.8 dated Feb. 10, 2020.

Kopp, Henning et al., "uMine: A Blockchain Based on Human Miners", 20th International Conference, ICICS 2018, Lille, France, Oct. 29-31, 2018, Proceedings, Jan. 1, 2018, pp. 25-32, 16th European Conference—Computer Vision, Cornell University.

\* cited by examiner

SYSTEMS AND METHODS FOR MINING ON A PROOF-OF-WORK BLOCKCHAIN NETWORK

CROSS REFERENCE TO RELATED APPLICATIONS

This application is the U.S. National Stage of International Application No. PCT/IB2020/054033 filed on Apr. 29, 2020, which claims the benefit of United Kingdom Patent Application No. 1906893.1, filed on May 16, 2019, and United Kingdom Patent Application No. 1912070.8, filed on Aug. 22, 2019, the contents of which are incorporated herein by reference in their entireties.

TECHNICAL FIELD

This disclosure relates generally to improved blockchain networks and associated protocols, including methods and systems for improving processing efficiency, reliability, security and resource requirements for computational tasks performed within a blockchain network. In particular, it relates to a blockchain network that implements a Proof-of-Work protocol.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain and alternative blockchain implementations and protocols fall within the scope of the present disclosure. The term "user" may refer herein to a human or a processor-based resource. The term "Bitcoin" is used herein to include any version or variation that derives from or is based on the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset/resource between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Nodes on the network ("miners") ensure that each transaction is valid, with invalid transactions being rejected from the network. Software clients installed on the nodes perform this validation work on an unspent transaction by checking that it conforms to the blockchain's protocol rules and also by executing the locking and corresponding unlocking scripts. If execution of the locking and unlocking scripts evaluate to TRUE, the transaction is valid. Thus, in order for a transaction to be written to the blockchain, it must be i) validated by the first node that receives the transaction—if the transaction is validated, the mining node relays it to the other nodes in the network; and ii) added to a new block built by a miner; and iii) mined, i.e. added to the public ledger of past transactions.

In order to build new blocks, the miners compete by performing resource-intensive work with the aim of being the first to find a solution (proof of work, also known as a "PoW" or "nonce") to a computation (puzzle). The difficulty of the puzzle can be adjusted over time to influence the rate at which new blocks are added to the blockchain. In Bitcoin, miners use the SHA256 hashing algorithm to find a PoW which, when hashed, produces a hash value that is lower than or equal to the current difficulty level set by the network protocol.

If a miner is the first to find the PoW to the current puzzle, that miner generates a new block which is then broadcast to the other miners on the network. The new block must contain the verifiable PoW if the other miners are to accept it as valid. Thus, mining provides a consensus mechanism which ensures that nodes on the network are synchronised and in agreement as to the legitimate and current state of the blockchain. It also protects against certain types of potential network attack, providing security for the network.

In the early days of Bitcoin, the computational requirements of mining were sufficiently low that miners could use general purpose computers comprising standard CPUs. However, a miner with a more powerful computer has a competitive advantage over a miner with a less powerful one. This incentive, combined with an historical increase in puzzle difficulty, has resulted in widespread use of Application-Specific Integrated Circuit (ASIC) mining devices. Moreover, groups of ASIC devices can be linked to share the work involved in finding the PoW solution. In such cases, different machines can be used to try different PoW nonces or ranges thereof. Thus, the mining algorithm can be parallelised across devices.

However, the more powerful devices are more expensive and require more energy for operation and cooling. Some have also argued that a hardware inequality promotes potential centralisation of mining power within the network, leading to possible drawbacks or vulnerabilities. These concerns have prompted interest in the development of "ASIC-resistant" mining solutions. However, proposed solutions involve modification of the PoW algorithm to change the collision-resistant SHA256 hash algorithm to so-called 'bandwidth-hard' functions, with limited or debateable success.

Thus, there is a need to solve, amongst others, the technical challenge of how to preserve the consensus mechanism and security provided by competing nodes on a blockchain network while reducing the cost, energy usage and computational resources required, and preserving the advantages of a decentralised network.

The present disclosure addresses at least these technical concerns by providing aspects and embodiments which comprise non-parallelised mining (NPM) techniques, hardware and software arrangements, networking technologies and methods and combinations thereof that use a non-parallelisable consensus mechanism. The disclosure may use an inherently sequential algorithm to provide security for, and establish consensus on, the state of a blockchain.

Herein, we use the term "sequential algorithm" to refer to an algorithm which has to be executed in sequence, from start to finish, without other processing executing in parallel.

Examples include iterative numerical methods such as Newton's method (Lipson, John D. "Newton's method: a great algebraic algorithm." *Proceedings of the third ACM symposium on Symbolic and algebraic computation.* ACM, 1976.) and algorithms that can be expressed mathematically using a recursive formula.

The term "inherently sequential" (or "non-parallelisable") algorithm is used herein to refer to a sequential algorithm that cannot be optimized using parallelisable routines/subroutines. It should be noted that the phrase has not been rigorously defined within the technical field, although the definition used herein is compatible with the intuitive usage of the term and definitions that exist in the literature (Greenlaw, Raymond. "A model classifying algorithms as inherently sequential with applications to graph searching." *Information and Computation* 97.2 (1992): 133-149).

It should also be noted that the terms "computational challenge" and "challenge" are known within the technical field, and will be readily understood by the person skilled in the art. The "challenge" can also be known as a "puzzle" within the art.

SUMMARY

Embodiments of the present disclosure provide computer-implemented protocols, methods and systems for use with or on a blockchain network. The blockchain network implements a Proof-of-work (PoW) blockchain protocol. This could be a blockchain protocol such as, for example, a version of the Bitcoin protocol. However, other blockchain protocols and implementations will also fall within the scope of the present disclosure.

A method in accordance with one or more embodiments may comprise generating a plurality of non-parallelisable challenges (or "puzzles") and allocating each one of said plurality of challenges to a respective miner on the network. Thus, preferably, the challenges are allocated such that each miner receives a different challenge from the other miners. The allocation can be performed in any suitable manner, such as, for example, selecting a node at random as the recipient for a given challenge from the plurality of challenges, although other allocation methods may be used. The challenges may be collision resistant in that there is a high probability of each challenge being unique within the plurality. Preferably, each miner then attempts to solve their allocated challenge. They may add data or input to the challenge such that the solution is unique among the solutions to the plurality of challenges.

In some embodiments, the generation of at least one of the multiparty computational challenges and/or further multiparty computational challenges comprises the calculation of an output to an operation which uses a random or pseudo-random input. Additionally, or alternatively, the generation of at least one of the multiparty computational challenges may comprise the generation of an RSA key pair.

Preferably, the mining node has to use an inherently sequential (non-parallelisable) algorithm in order to find a solution to its allocated challenge. The inherently sequential algorithm may comprise at least one of the following operations: a recursive operation; a modular exponentiation; and/or a repeated squaring operation. Such algorithms comprise a set of predetermined steps which must be executed to arrive at a result. Thus, embodiments of the disclosure diverge from known PoW arrangements in which the miners simply repeat a hashing function until a solution is arrived at, without the requirement that they execute a predetermined set of steps or operations. The inherently sequential algorithm may require the output of one operation to be used as input to a subsequent operation in order for a result (solution) to be generated.

Preferably, the challenges are generated by a committee of nodes, and a new set of challenges is generated for each block. There may be 3 or more nodes, each being a trusted entity. The nodes are independent from one another in that they cannot collude. Thus, a cycle or loop may be performed wherein, for each cycle, a plurality of further (new) multi-party computational challenges in generated. Each new set of challenges is distributed across the miners at the start of each cycle. Thus, each miner may receive a new challenge at the start of each cycle. The cycle may be repeated so that new challenges are allocated to the mining nodes. Preferably, the cycle is repeated for each new block that is to be added to the blockchain. Thus, when one of the mining nodes has found a solution to its allocated challenge during a previous cycle (i.e. they have provided a proof-of-work which allows them to mine the next block of transactions), a new set of challenges is generated and the cycle begins again.

Preferably, generation of the plurality of multiparty computational challenges and/or the plurality of further multiparty computational challenges is performed, at least in part, by a plurality of computer-based entities. This may be a subset of entities selected from a set/larger plurality of computer-based entities. In other words, a committee of nodes may be used to generate the challenges. In accordance with one more embodiments, the committee may be a sub set of the mining nodes on the network. In other embodiments, only some or none of the entities that perform the challenge generation may be mining nodes. In some embodiments, the subset of computer-based entities is selected from the plurality of computer-based entities by using a process that is random or pseudo-random.

In one or more embodiments, the plurality of computer-based entities which generates the challenges may be re-selected from a/the larger plurality of computer-based entities at a pre-determined time. This time may be based on (or influenced by) the start of a cycle as described above.

Advantageously, embodiments of the disclosure involve the allocation and/or distribution of an inherently sequential algorithm that is unique to each miner (rather than all miners attempting to be the first to solve the same common, shared problem). Thus, the present disclosure adopts an entirely different, opposing approach to mining compared to the prior art. This new approach provides a random variance between the problems that the miners are attempting to solve. This random variance may be provided, for example, by the random output of a hash function, in which the input varies and is randomly generated. This means that it is difficult to predict, and for every new block the miners have to find a solution to their newly allocated problem by repeating the steps of the sequential algorithm. The number of iterations required will vary between the set of miners. This means that it may be possible to more reliably establish which miner has earned the right to mine the next block. In contrast, the existing approach means that the miner with a faster clock speed gains an advantage. Thus, embodiments of the disclosure provide a significant deviation from the conventional PoW blockchain mining approach. An improved blockchain network and associated protocol is, therefore, provided. Security of the blockchain network is preserved while efficiency is enhanced.

These and other aspects of the present invention will be apparent from and elucidated with reference to, the embodiments described herein. An embodiment of the present disclosure will now be described, by way of example only, and with reference to the accompany drawings, in which:

DESCRIPTION OF ILLUSTRATIVE EMBODIMENTS

Embodiments of the present disclosure utilize a mining puzzle which comprises a 'trap-door' computation with the following characteristics:
1. Can be performed quickly, if some secret information is known;
2. Requires a configurable time to perform, if the solver does not know some secret information.

As disclosed in Rivest, Ronald L., Adi Shamir, and David A. Wagner "*Time-lock puzzles and timed-release crypto*" (1996)—herein after "Rivest et al—the 'trap door' could be knowledge of an RSA private key, or at least the ability to compute two independent values using the private key.

In accordance with one or more preferred embodiments of the present disclosure we generate a new puzzle for each miner and for each block, via a multi-party computation (MPC) between a committee of agents (nodes). In some embodiments, the committee comprises a subset of eligible miners which is selected in a random or pseudo-random fashion from the plurality of mining nodes on the blockchain network. Shares in the randomly generated RSA modulus are held by committee members such that the secret keys corresponding to the puzzles for a given block is not known to anyone (until the block is confirmed). In one or more embodiments, the committee and/or secret keys change after each block.

Figure 1:
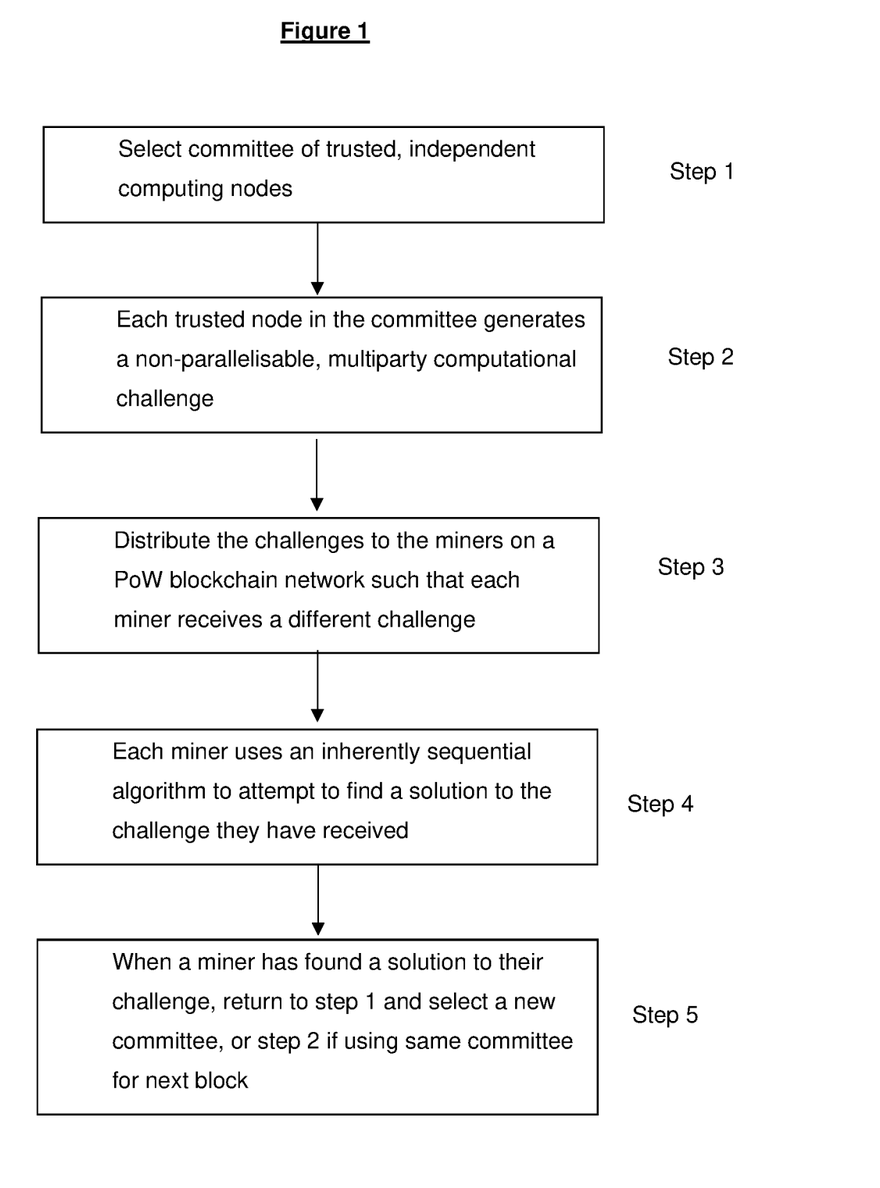
FIG. 1 is a flowchart illustrating an embodiment of the present disclosure.

This is illustrated in FIG. 1, in which a committee of trusted, independent nodes (eg miners) is selected at step 1. At step 2, each node in the committee generates a non-parallelisable computational challenge. This challenge has to be solved using a non-parallelisable, inherently sequential algorithm. At step 3, each miner receives a challenge. Thus, the miners seek to find a solution to their own problem, which they do at step 4. When a miner has found a solution to their challenge, the cycle repeats for each block that is mined into the blockchain.

Components of an arrangement in accordance with the present disclosure comprise:
1. a committee of independent miners (See Gilad, Yossi, et al. "*Algorand: Scaling byzantine agreements for croptocurrencies*" Proceedings of the 26th Symposium on Operating Systems Principles. ACM, 2017)
2. Multiparty primes computation (See Algesheimer, Joy, Camenisch, Jan and Shoup, Victor, *Efficient Computation Modulo a Shared Secret with Application to the Generation of Shared Safe-Prime Products* [Online]; and Boneh, Dan, and Matthew Franklin, "*Efficient generation of shared RSA keys*" Annual International Cryptology Conference, Springer, Berlin, Heidelberg, 1997)
3. Hash functions as pseudorandom number generators
4. Time-lock puzzles based on repeated squaring (See Rivest et al)
5. MPC to verify solutions block (See Algesheimer, Joy, Camenisch, Jan and Shoup, Victor "*Efficient Computation Modulo a Shared Secret with Application to the Generation of Shared Safe-Prime Products*" [Online])

Mining Algorithms

Any mining algorithm, non-parallelisable or otherwise, fundamentally must adhere to the following properties if it is to be used to achieve consensus on the state of a blockchain:

Property 1: The process of completing the mining algorithm, by generating a valid proof of computation C, must take a sufficiently long time.

Property 2: Given a candidate proof of computation C, it must be possible to verify that C is a valid proof of computation in a much shorter time than taken to generate a valid C.

In general, there are two broad ways in which we can have a mining algorithm achieve the paradigm defined by these properties: by using a trap-door mining function, or by using time-based constraints that observes both above properties.

Trap-Door Mining Function

In general, a good one-way trap-door function will be difficult to compute but will be easy to verify when presented with some additional information and can therefore be mapped to a mining process that has both properties one and two.

For example, in the Rabin Cryptosystem a public key n=p·q is generated from a private key (p, q) where p, q are both primes. Calculating a signature (S, U) on a message m is a one-way function whose solution is a value S which satisfies the equation $$H(m\|U) = S^2 \bmod n.$$

The algorithm for finding a valid S is a trap-door algorithm or function because it is difficult to find S given (n, m, U), but is easy if the factorisation of n is known. The important point here is that, before knowledge of the trap door, mining should be hard and thus take a period of time sufficiently larger than network messaging latency. However, once the solution is found the trap door can be published or jointly computed enabling fast verification the solution using that trap door. Herein, a trap-door mining function known as a time-lock puzzle is used to construct a consensus algorithm for non-parallelisable mining on a blockchain network Time Lock Puzzles Time-lock puzzles are problems that take a predetermined time to complete. We call an algorithm $F_h$ a time-lock puzzle if for some given input parameters a, t such that $$F_h(a, t) = L,$$

there exists another algorithm $F_e$ with $O(F_e) \ll O(F_h)$ such that $$F_e(a, t, s) = L$$

if and only if s is known. Moreover, the ability to accurately control the time taken for a computer to complete the algorithm though the input parameters requires $F_h$ be a function that is inherently sequential so that the task cannot be shared between machines.

Repeated Squaring as an Inherently Sequential Algorithm

The core problem is to compute $a^{2^t}$ mod n for specified values of a, t and n. In this paper we consider the problem when n is the product of two large primes, and t is chosen to set the desired level of difficulty of the puzzle. a is chosen to be a random and can be player specific. The most efficient way of solving the puzzle is by performing t successive squarings modulo n, beginning with the value a. That is, perform the following algorithm:

| Algorithm 1 |
| --- |
| For i from 0 to t − 1 compute<br>W(0) = a<br>W(i + 1) = W(i)$^2$ mod n | to yield W(t). There is no known way to perform this computation in a more efficient way without knowing the factorization of n.

RSA Repeated Squaring Time-Lock Puzzle

Rivest et al introduced a time-lock puzzle based on repeated squaring. Consider a scenario in which Alice creates a puzzle for Bob to solve 1. Alice generates a composite modulus $$n = pq$$

Where p, q are prime. She keeps ret.

2. Alice computes a second modulus $$\phi(n) = (p-1)(q-1)$$

which is kept secret.

3. Alice selects puzzle computational time, T, and computes $$t = TS$$

where S is the squaring rate (measure of computational speed) for Bob.

4. Alice picks random base, a, and computes $\hat{L}:=F_e(a, t, \phi(n))$ efficiently by using the following algorithm $$e = 2^t \bmod \phi(n) \quad \text{a.}$$

$$\hat{L} = a^e \bmod n \quad \text{b.}$$

where $\phi(n)$ is the trap-door function.

5. Alice sends the time-lock puzzle (a, t, n) to Bob and asks him to find $L=F_h(a, t)$, where $$L = a^{2^t} \bmod n$$

It can be shown by using Fermat's test that $\hat{L}=L$. The fastest known way of computing L without knowing (p, q) and $\phi(n)$ is to use Algorithm 1. Step 4a, however, significantly increases efficiency of computing the puzzle solution. The time-complexity of $F_e(a, t, \phi(n))$ is O(log (t)) whilst $F_h(a, t)$ has complexity O(t).

Repeated squaring is considered an 'inherently sequential' process, meaning that there is no obvious way of parallelising it to any large degree—see Rivest et al. Therefore, having many computers solving the puzzle gains no advantage over having one and the variation in computational time is related to the speed of single computers, which can be much more easily gauged by the puzzle creator. In other words, the puzzle sent by Alice has a solution time that is controllable independent of Bob's computational resources.

Prime Factorisation Difficulty

An important assumption in the implementation of the time-lock puzzle is that finding the prime factorisation of n is a hard problem that cannot be solved faster than the puzzle itself. To justify this assumption, consider the following reasoning. The best algorithm for solving the integer factorisation problem, the general number field sieve (NFS) has time complexity $O(\exp\{c(\ln n)^{1/3}(\ln \ln n)^{2/3}\})$ ($c \approx 2.77$). (See Buchmann, Johannes, Jiirgen Loho, and Jorg Zayer. "An implementation of the general number field sieve." *Annual International Cryptology Conference*. Springer, Berlin, Heidelberg, 1993).

A 256-bit RSA key for example can be factorised in approximately $O(\exp(46.6))=2.5\times10E20$ operations. Assuming that each operation in NFS is equivalent to 1 floating point operation, cracking 256-bit keys still takes approximately 250,000 seconds for a 1 petaFLOPS (floating point operations per second) computer.

Within the context of a regularly updated blockchain, we require a different RSA modulus to be created every new block. Therefore, we only require that finding the prime factorisation of n be infeasible in the same amount of time as the block generation time (a few minutes for example). By setting the RSA keys to 512-bits it can be safely assumed that factorisation of the RSA moduli within the mining cycle is infeasible.

Verifiable Random Functions

A verifiable random function (VRF) is a triple of algorithms (See https://medium.com/algorand/algorand-releases-first-open-source-code-of-verifiable-random-function-93c2960abd61):

Keygen(r)→(VK, SK)—On a random input seed r the key generation algorithm produces a verification key VK and a secret key SK pair Evaluate(SK, m)→(Y, ρ)—The evaluation algorithm takes as input the secret key SK, a message m and produces a pseudorandom output string Y and a proof ρ

Verify(VK, m, Y, ρ)→0/1—The verification algorithm takes as input the verification key VK, the message m, the output Y and the proof ρ. It outputs 1 if and only if it verifies that Y is the output produced by the evaluation algorithm on inputs SK and m.

Importantly, the output Y is unique, meaning that it is impossible to find unless the secret key is known. Below, we provide a detailed implementation of subcommittee selection using verifiable random functions.

Unique and Secure Subcommittee Selection

In accordance with some embodiments of the disclosure, the subcommittee selection uses an ECDSA signature to replicate the verifiable random function. The process can be categorised into 3 stages: setup, pseudorandom value creation and subcommittee selection.

Consider a network of miners $M_1, \ldots, M_N$ (N>3).

Setup

Step 1: Miners have public keys $PK_1, PK_2, \ldots, PK_N$ respectively

Step 2: Miners choose unique seeds $S_1, \ldots, S_N$. These values are propagated and are fixed for each public key Pseudorandom Value Creation Step 3: for each new block the miner creates a message. The message is simply the hash of miner's seed value concatenated with the previous block header. That is for miner $PK_i$ mining block $B_k$ his unique message is $$m_{i,k} = H(S_i \| X_{k-1})$$

where $X_{k-1}$ is the hash of the previous block header $X_{k-1} = H(BH_{k-1})$ Step 4: Miners produce ECDSA signatures on their messages that is $$ECDSA(sk_i, m_{i,k}) \rightarrow (s_i, r_i)$$

The miner records the time elapsed between at when the timestamp for block $B_{k-1}$ and when signature was generated. The difference is denoted $T_i^e$ Step 5: Each Miner $M_i$ propagates his proof ($PK_i$, $m_{i,k}$, $s_i$, $r_i$, $T_i^e$)

Subcommittee Selection

Step 6: On receiving the proof each network node checks the following

1) The message $m_{i,k}$ is valid for miner $PK_i$
2) The signature ($s_i$, $r_i$) for message $m_i$ is valid against $PK_i$
3) The difference between $T_i^e$ and the time the proof message was received is less than the network latency, $T_L$. i.e. when a message is received miner j checks $$T_L < T_{Recieved}^j - (T_i^e + T_B)$$

Where $T_B$ is the timestamp for the most recent block and $T_{Received}^j$ is the time the message is received by miner j. This constraint prevents miners from falsely reporting the time the signature was created 4) Only one proof message will be accepted for a miner $PK_i$. Any further proof messages will be ignored.

Step 7: The subcommittee members is selected by the following process

1) The value for miner with public key $PK_i$ is $$V_i = s_i \cdot 16^{T_i^e}$$

2) The public keys are ranked in order of value $V_i$ i∈ $\{1, \ldots, N\}$
3) The subcommittee is selected by choosing the miners with the 3 lowest values of $V_i$ $V_i$ is the output of the VRF with components $s_i$ and $T_i^e$. $s_i$ is the pseudo randomly generated component of the ECDSA signature. The time value acts as a penalty to prevent miners from brute-forcing through ECDSA ephemeral keys until a value of $s_i$ is low enough for them to increase their chances in being selected for the subcommittee. Although other solutions that prevent brute-force attacks have been investigated by Goldberg and Reyzin they require the creation of new elliptic curve algorithms and cannot be implemented as easily as embodiments of the present disclosure (Goldberg, Sharon, et al. "*Verifiable random functions (VRFs)*" (2018)).

In order for miners to agree on the subcommittee candidate list, each proof needs to be propagated throughout the network. Assuming low latency and high connectivity, the network should be able to quickly establish a global list of miner values and therefore establish the subcommittee. Furthermore, the network will only accept one proof message (the first one sent) per miner preventing the risk of spam attacks.

Multiparty Computations

A multiparty computation may be described as a calculation that requires more than one (independent) entity to collaborate in order to generate some final value. Ideally, the entities do not share or communicate their inputs, and keep their inputs private, whilst generating this final output. Within the context of non-parallelised mining, and in accordance with one or more embodiments of the present disclosure, a multiparty computation may comprise the calculation of anRSA modulus used in a repeated squaring time-lock puzzle. In such an embodiment, it is important that the prime factorization of the RSA modulus is not controlled by any single miner.

MPC for Generating Secret RSA Moduli

While other algorithms or methods may be selected by the skilled person, for illustrative purposes embodiments of the present disclosure may use the method disclosed by Boneh and Franklin for generation of a shared prime modulus n (Boneh, Dan, and Matthew Franklin, "Efficient generation of shared RSA keys." *Annual International Cryptology Conference*. Springer, Berlin, Heidelberg, 1997, herein after "Boneh et al"). In their algorithm 3, independent entities (Alice, Bob and Henry) establish an RSA modulus of arbitrary size. The method is a quintuple of algorithms:

PickCandidates(k)→($p_i$, $q_i$)—Each entity picks two random k-bit integers

Compute N—Using a private and distributed computation (p. 3 of Boneh et al) the 3 servers compute $$n = (p_1 + p_2 + p_3) \cdot (q_1 + q_2 + q_3)$$

without explicitly sharing ($p_i$, $q_i$)

Since n is now public the entities perform trial division to check that n is not divisible by small primes e.g. the method which is used in the joint verifiable random secret sharing (JVRSS) protocol in threshold ECDSA signature implementations.

Primality Test—The 3 servers use a private distributed computation to test that n is in fact the product of two primes (See p. 4, Boneh et al). If the test fails, then the protocol is restarted from step 1.

Boneh et al give empirical data for experiments generating 512, 1024 and 2048-bit moduli (Table 2, p. 10, Boneh et al). Notably, the total time for 3 parties (using 333 MHz Pentium IIs running Solaris 2.5.1) to generate a 512-bit modulus was 9 seconds and had a total network traffic of 0.18 Mb.

MPC For Computing n

For the multiparty generation of the RSA modulus n=pq with private key (p, q) we adapt the method outlined in Boneh et al. The algorithm assumes a randomly selected subcommittee of 3 miners using a minimal number of rounds of communication.

Setup

Miners $M_1$, $M_2$, $M_3$ are selected using the Unique and Secure Subcommittee Selection. Miners must establish a direct connection with one-another and all messages between them are encrypted using AES symmetric encryption. The AES key is established using elliptic curve Diffie Hellmann key exchange.

Multiparty Computation

Step 1: Miners $M_1$, $M_2$, $M_3$ pick candidates $(p_1, q_1)$, $(p_2, q_3)$ and $(p_3, q_3)$, respectively, keeping the information secret.

Step 2: Miners $M_1$, $M_2$, $M_3$ use JVRSS to compute $$n = (p_1 + p_2 + p_3) \cdot (q_1 + q_2 + q_3)$$

Step 3: Miners $M_1$, $M_2$, $M_3$ perform a distributed primality test (see p. 4, Boneh et al) to determine whether n is a product of two primes.

Step 4: If step 3 results in a valid composite n being found n is propagated to the rest of the network MPC For Computing Ø(n)

Given that the multiparty computation been computed above, the next stage is computing $\phi(n)$. To do this the miners need to know who miner $M_1$ is as the calculation becomes asymmetric. However, this can be established during the subcommittee selection process Step 1: Miner $M_1$ computes $$\phi_1 = n - p_1 - q_1 + 1$$

Step 2: $M_2$ and $M_3$ compute $$\phi_2 = -p_2 - q_2, \phi_3 = -p_3 - q_3,$$

Step 3: Each of the subcommittee members can use a distributed computation to compute $$\phi(n) = \phi_1 + \phi_2 + \phi_3$$

Observe that $$\phi(n) = (\phi_1 + \phi_2 + \phi_3)$$
$$= (n - p_1 - q_1 + 1) + (-p_2 - q_2) + (-p_3 - q_3)$$
$$= n - (p_1 + p_2 + p_3) - (q_1 + q_2 + q_3) + 1$$
$$= n - p - q + 1$$
$$= (p - 1)(q - 1).$$

Note that once $\phi(n)$ is known to the committee, everyone in the committee will be able to deduce (p, q). It can be shown (without loss of generality) that $$p = \frac{n + 1 - \phi(n) + \sqrt{(n + 1 - \phi(n))^2 - 4n}}{2},$$

$$q = \frac{n + 1 - \phi(n) - \sqrt{(n + 1 - \phi(n))^2 - 4n}}{2},$$

and so $\phi(n)$ must not be computed until after a solution to the time-lock puzzle has been proposed. Therefore, it is especially important that $\phi(n)$ is not be shared by the committee until after a valid block is found.

Time-Locked Puzzle Mining on the Non-Parallelisable Mining (NPM) Blockchain

Embodiments of the disclosure combine verifiable random functions, multiparty computations and time lock puzzles in a novel way to create a mining algorithm for a PoW blockchain network. The aim of the algorithm is to compute a number, L, that is hard to find but can be verified if some secret information is known.

Assumptions:

In order for network-wide consensus to be achieved for each cycle we require the following:

Honest majority: At least 51% of the miners must be honest. Same requirement exists for all public blockchain networks Honest majority subcommittee: 2 out of 3 members of each subcommittee must be honest to prevent the leaking of private keys or trap door function. Any suitable incentivisation strategy may be employed.

Full Connectivity: The selection of random subcommittees in the network require full connectivity between miners so that multiparty computations can be carried out efficiently Method 1: Predetermined number of Squarings Method Step 1: A group of network miners $M_1, \ldots, M_n$ (n>3) start the cycle by selecting a subcommittee of 3 (connected) miners ($M_1$, $M_2$ and $M_3$ without loss of generality) using a verifiable random function.

Step 2a: Miners $M_1$, $M_2$ and $M_3$ do a multiparty computation to compute $$n = pq$$

without any individual miner able to calculate (p, q).

Step 2b: Miners $M_1$, $M_2$ and $M_3$ propagate time-lock puzzle (t, n) along with a proof that they were chosen at random Step 3a: Miner $M_i$ with public key $PK_i$ receives (t, n) and computes $$L_i = 2^{H(X\|PK_i)[0:4]} \mod n$$

where X is the previous block header hash.

Step 3b: Miner $M_i$ receives (t, n) and computes $$a = L_i \mod 32$$

$$b = L_i + 4 \mod 32$$

$$t_i = H(X\|PK_i)[a:b]$$

Step 3c (HARD PROBLEM): Miner $M_i$ computes a verifiably random $$L = L_i^{2^{t+t_i}} \bmod n$$

L is the solution

Step 4: (Assuming $M_i$ wins) Miner $M_i$ propagates (L, $L_i$, $t_i$, $PK_i$). This solution will be propagated along with the miner's block.

Step 5a: Verifier checks $$L_i = 2^{H(X||P \cdot K \cdot)[0:4]} \bmod n.$$

Step 5b: Miners $M_1$, $M_2$ and $M_3$ use a secure multiparty computation to compute $$\phi(n) = (p-1)(q-1)$$

and computes the shortcut e and $e_i$ efficiently using the formula $$e = 2^t \bmod \phi(n)$$
$$e_i = 2^{t_i} \bmod \phi(n),$$

Step 5c: Each subcommittee member can check that $$\tilde{L} = L_i^{e \cdot e_i} \bmod n.$$

And $$\tilde{L} = L$$

Step 6: The block is accepted as valid by the subcommittee if Step 5c passes. $\phi(n)$ can be propagated along with the valid block and (L, $L_i$, $t_i$, $PK_i$) to the rest of the network for other miners to validate the solution before updating the blockchain.

Analysis:

The scheme presented has the following key features

Puzzles are time-locked using two values: t and $t_i$. t is the minimum number of squarings for the puzzle and acts as a network-wide difficulty parameter. $t_i$ is a pseudo randomly generated value, unique to each miner and each new block. Furthermore $t_i$ cannot be immediately deduced, instead requiring some initial computations in order to be worked out.

Puzzle solution can only be solved using sequential computation

Hash function digest acts as a random number generator so that the puzzle is unique to each miner The pseudorandom nature of the base and exponent used in the calculation means that, whilst miners can estimate the approximate time that the solution will take to compute, they will not be able to tell exactly until they begin to mine.

Additionally, time-constraints can be imposed on Steps 1-2b and 5c so that corrupted, slow or dishonest subcommittees are rejected and can easily be reselected. Note, this system does not require use proof-of-stake in the selection of the subcommittee (although this may be desirable in implementation).

Method 2: Repeated Squaring Nonce with a Target Threshold

An alternative application of the time-lock puzzle mining for the NPM blockchain uses a target so that the number of squarings cannot be predetermined by the miner before calculation begins.

Target and Difficulty:

We introduce the target $$T_i = \frac{n}{D_i}$$

The target value represents the maximum value that will be accepted as a valid solution. This value is analogous to the target difficulty parameter in Bitcoin (it can be encoded in the block header for example) and the subcommittee will know this value at the time of verification—see https://en.bitcoin.it/wiki/Difficulty.

Distribution of Squares

Note that approximately ¼ of all values in the range $\{0, \ldots, n-1\}$ are quadratic residues when n is a product of two primes. This result is derived from Euler's criterion (Lehmer, Emma. "On Euler's criterion." *Journal of the Australian Mathematical Society* 1.1 (1959): 64-70). Furthermore, for sufficiently large random composite modulus, n, the distribution of quadratic residues is approximately uniform, meaning that the likelihood of selecting a quadratic residue in the range $0, 1, \ldots, T_i$ is equivalent to the likelihood of selecting a random number from $\mathbb{Z}_n$ in the range $0, 1 \ldots, T_i$ multiplied by the likelihood of selecting a quadratic residue $\mathbb{Z}_n$. This constraint is important because we assume that for a given input $L_i \in \mathbb{Z}_n$ and random $t \in \mathbb{Z}_n$ with $$A = L_i^{2^t} \bmod n,$$

then $$P(A < T_i) \approx \frac{T_i}{n}.$$

Hashing the Solution: Our solution to the perceived ambiguity of the distribution of squares is to hash L and measure that value against the target i.e. to check if $$H(L) < T_i.$$

Method

Step 1: A group of network miners $M_1, \ldots, M_n$ (n>3) start the cycle by selecting a subcommittee of 3 (connected) miners ($M_1$, $M_2$ and $M_3$ w.l.o.g.).

Step 2a: Miners $M_1$, $M_2$ and $M_3$ perform a multiparty computation to compute $$n = pq$$

without explicitly calculating (p, q).

Step 2b: Miners $M_1$, $M_2$ and $M_3$ propagate time-lock puzzle (t, n) along with a proof that they were chosen at random Step 3a: Miner $M_i$ with public key $PK_i$ receives (t, n) and computes $$L_i = 2^{H(X\|PK_i)[0:4]} \mod n$$

where X is the previous block header hash.

Step 3b (HARD PROBLEM): Miner $M_i$ receives (t, n) and tries to find $t_i$ such that $$L = L_i^{2^{t+t_i}} \mod n, \text{ and } H(L) < T_i.$$

L is the solution and $T_i$ is the target.

Step 4: (Assuming $M_i$ wins) Miner $M_i$ propagates (L, $L_i$, $t_i$, $PK_i$). This solution will be propagated along with the miner's block.

Step 5a: Verifier checks $$L_i = 2^{H(X\|PK_i)[0:4]} \mod n$$

Step 5b: Miners $M_1$, $M_2$ and $M_3$ use a secure multiparty computation to compute $$\phi(n) = (p-1)(q-1)$$

and computes the shortcut e and $e_i$ efficiently using the formula $$e = 2^t \mod \phi(n)$$

$$e_i = 2^{t_i} \mod \phi(n), \text{ and } e \cdot e_i \mod \phi(n)$$

Step 5c: Each subcommittee member can check that $$\check{L} = L_i^{e \cdot e_i} \mod n.$$

and $$H(\check{L}) < T_i.$$

Step 6: The block is accepted as valid by the subcommittee if Step 5c passes. #(n) can be propagated along with the valid block and (L, $L_i$, $t_i$, $PK_i$) to the rest of the network for other miners to validate the solution before updating the blockchain.

Analysis

This technique has the following features

Puzzles are time-locked using two values: t and $t_i$. t acts as a standard difficulty parameter and is a uniform minimum number of squarings for the puzzle whereas $t_i$ is analogous to a nonce. This means that a miner will not be able to tell how many additional squarings are required without doing the computations Puzzle solution (analogous to the nonce in Bitcoin) can only be found using sequential computation.

The puzzle solution (nonce) is public key dependent. This means that a new public key has to be generated for each entity that iterates nonce values As with Method 1, time-constraints can be imposed on Steps 1-2b and 5c so that corrupted, slow or dishonest subcommittees are rejected and can easily be reselected. Furthermore, the nonce iteration path is inherently sequential and dependent on a public key, resulting in an inability for miners to gain any advantage by mining on the same block candidate. This significantly reduces the incentive to form mining pools.

Thus, embodiments of the disclosure provide a method that enables a flat network of distributed computers to establish consensus through sequential proof of computation. Four algorithms may be used: subcommittee selection using verifiable random functions, multiparty computations for establishing RSA modulus, time-lock puzzles with pseudo-random inputs. Embodiments of the disclosure also make use of cryptographic primitives native to the Bitcoin protocol (hash functions, elliptic curve cryptography) as well as puzzles based on the difficulty of prime factorisation.

Given the assumptions of low network latency and an honest majority of network participants as well as honest majority subcommittee selection, embodiments are both economically feasible at scale and strongly resistant to mining centralisation.

Figure 2:
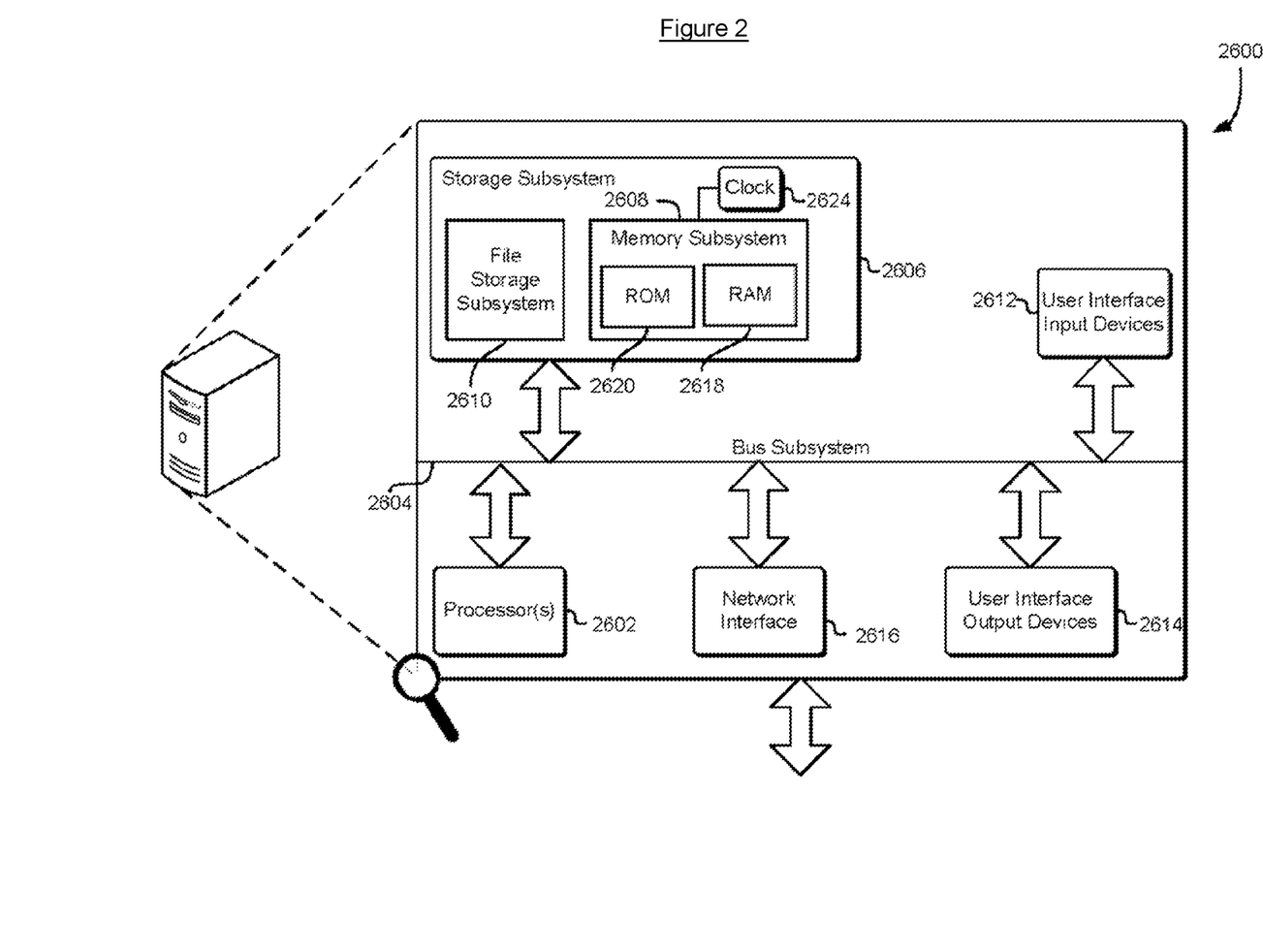
FIG. 2 is a schematic diagram illustrates a computing environment in which various embodiments can be implemented.

Turning now to FIG. 2, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 2, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 2 is intended only as a specific example for purposes of illustrating the preferred embodiment of the device. Many other configurations having more or fewer components than the system depicted in FIG. 2 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

An embodiment of the disclosure may provide a computer-implemented method comprising the steps:
  generating a plurality of multiparty computational challenges;
  providing each mining node in a plurality of mining nodes on a Proof-of-Work blockchain network with a respective challenge from the plurality of multiparty computational challenges.

Preferably, each mining node receives a different challenge relative to the other nodes. Thus, each challenge may be unique to the node to which it is provided, and no two challenges within the plurality of multiparty computational challenges may be the same.

Each mining node in the plurality of mining nodes attempts to find a solution to its respective multiparty computational challenge. This may comprise each node generating an output/value. This may be performed by using one or more inputs to an algorithm. The input(s) may be kept secret or private by the respective nodes, in that they do not share or communicate their respective input values with the other nodes in the plurality of nodes.

Preferably, each challenge in the plurality of multiparty computational challenges requires the use of an inherently sequential algorithm to find a solution to the challenge. The method may further comprise the steps of:
  generating a plurality of further multiparty computational challenges; and/or
  providing each mining node in the plurality of mining nodes with a respective further challenge from the plurality of further multiparty computational challenges.

Preferably, these steps are performed when a solution has been found, by one of the mining nodes in the plurality of mining nodes, to a multiparty computational challenge or a further multiparty computational challenge.

Preferably, generation of the plurality of multiparty computational challenges and/or the plurality of further multiparty computational challenges is performed, at least in part, by a subset of computer-based entities which is selected from a plurality of computer-based entities. At least one of the computer-based entities may be a mining node on the blockchain network. The subset of computer-based entities may be selected from the plurality of computer-based entities according to a random or pseudo-random selection process.

Generation of at least one of the multiparty computational challenges and/or further multiparty computational challenges may comprise the calculation of an output to an operation which uses a random or pseudo-random input. Generation of at least one of the multiparty computational challenges and/or further multiparty computational challenges may comprise the generation of an RSA key pair.

The challenge may comprise the calculation of an RSA modulus. Preferably, the RSA modulus is used in a repeated squaring time-lock puzzle.

The method may further comprise the step of using an inherently sequential algorithm to find a solution to at least one of the multiparty computational challenges and/or further multiparty computational challenges. The inherently sequential algorithm may comprise at least one of the following operations: a recursive operation; a modular exponentiation; and/or a repeated squaring operation.

The invention also provides a system, comprising:
a processor; and
memory including executable instructions that, as a result of execution by the processor, causes the system to perform any embodiment of the computer-implemented method described herein.

Preferably, the system comprises a plurality of nodes on a blockchain network, at least one of the nodes comprising the processor, memory and executable instructions.

The invention also provides a non-transitory computer-readable storage medium having stored thereon executable instructions that, as a result of being executed by a processor of a computer system, cause the computer system to at least perform an embodiment of the computer-implemented method described herein.

The invention claimed is:

1. A computer-implemented method, comprising:
generating a plurality of multiparty computational challenges; and providing each mining node in a plurality of mining nodes on a Proof-of-Work blockchain network with a respective challenge from the plurality of multiparty computational challenges; and wherein the respective challenge comprises the calculation of an RSA modulus that is used in a repeated squaring time-lock puzzle.

2. The method of claim 1 wherein:
each challenge in the plurality of multiparty computational challenges requires use of an inherently sequential algorithm to find a solution to the challenge.

3. The method of claim 1, further comprising the step of:
generating a plurality of further multiparty computational challenges; and
providing each mining node in the plurality of mining nodes with a respective further challenge from the plurality of further multiparty computational challenges.

4. The method of claim 3, wherein the steps of claim 3 are performed when a solution has been found, by one of the mining nodes in the plurality of mining nodes, to a multiparty computational challenge or a further multiparty computational challenge.

5. The method of claim 1, wherein:
generation of the plurality of multiparty computational challenges and/or the plurality of further multiparty computational challenges is performed, at least in part, by a subset of computer-based entities which is selected from a plurality of computer-based entities.

6. The A-method of claim 5 wherein at least one of the computer-based entities is a mining node on the blockchain network.

7. The A-method of claim 5, wherein the subset of computer-based entities is selected from the plurality of computer-based entities according to a random or pseudo-random selection process.

8. The A-method of claim 1, wherein:
the generation of at least one of the plurality of multiparty computational challenges and/or further multiparty computational challenges comprises calculation of an output to an operation which uses a random or pseudo-random input.

9. The A-method of claim 1, wherein:
the generation of at least one of the plurality of multiparty computational challenges and/or further multiparty computational challenges comprises the generation of an RSA key pair.

10. The A-method of claim 1, further comprising the step of using an inherently sequential algorithm to find a solution to at least one of the plurality of multiparty computational challenges and/or further multiparty computational challenges.

11. The method of claim 10, wherein the inherently sequential algorithm comprises at least one of the following operations:
a recursive operation;
a modular exponentiation; and
a repeated squaring operation.

12. A computer-implemented system comprising: a processor; and memory including executable instructions that, as a result of execution by the processor, causes the system to perform the steps of: generating a plurality of multiparty computational challenges; and providing each mining node in a plurality of mining nodes on a Proof-of-Work blockchain network with a respective challenge from the plurality of multiparty computational challenges; and wherein the respective challenge comprises the calculation of an RSA modulus that is used in a repeated squaring time-lock puzzle.

13. The computer implemented system of claim 12, wherein the system comprises a plurality of nodes on a blockchain network, at least one of the nodes comprising the processor, memory and executable instructions of claim 12.

14. The computer-implemented system of claim 12, wherein:
each challenge in the plurality of multiparty computational challenges requires use of an inherently sequential algorithm to find a solution to the challenge.

15. The computer-implemented system of claim 12, wherein the executable instructions, as a result of execution by the processor, causes the system to perform the steps of:
generating a plurality of further multiparty computational challenges; and
providing each mining node in the plurality of mining nodes with a respective further challenge from the plurality of further multiparty computational challenges.

16. The computer-implemented system of claim 12, wherein the steps of claim 13 are performed when a solution has been found, by one of the mining nodes in the plurality of mining nodes, to a multiparty computational challenge or a further multiparty computational challenge.

17. A non-transitory computer-readable storage medium having stored thereon executable instructions that, as a result of being executed by a processor of a computer system, cause the computer system to perform the steps of: generating a plurality of multiparty computational challenges; and providing each mining node in a plurality of mining nodes on a Proof-of-Work blockchain network with a respective challenge from the plurality of multiparty computational challenges; and wherein the respective challenge comprises the calculation of an RSA modulus that is used in a repeated squaring time-lock puzzle.

18. The non-transitory computer-readable storage medium of claim 17, wherein:
   each challenge in the plurality of multiparty computational challenges requires use of an inherently sequential algorithm to find a solution to the challenge.

19. The non-transitory computer-readable storage medium of claim 18, wherein the executable instructions, as a result of being executed by the processor of the computer system, cause the computer system to perform the steps of:
   generating a plurality of further multiparty computational challenges; and
   providing each mining node in the plurality of mining nodes with a respective further
   challenge from the plurality of further multiparty computational challenges.

\* \* \* \* \*